United States Patent [19]
Todd, Jr.

[11] 3,968,394
[45] July 6, 1976

[54] CATHODE RAY TUBE EMPLOYING FACEPLATE-DEPOSITED CATHODOCHROMIC MATERIAL AND ELECTRON BEAM ERASE

[75] Inventor: Lee T. Todd, Jr., Belmont, Mass.

[73] Assignee: Massachusetts Institute of Technology, Cambridge, Mass.

[22] Filed: Apr. 1, 1974

[21] Appl. No.: 457,111

[52] U.S. Cl. ............................ 313/465; 350/160 P
[51] Int. Cl.² .................... H01J 29/12; G02B 5/23; G02F 1/23
[58] Field of Search ................................... 313/465

[56] References Cited
UNITED STATES PATENTS

| | | |
|---|---|---|
| 2,535,817 | 12/1950 | Skellett ............................... 315/12 |
| 3,413,505 | 11/1968 | Hart et al. ........................... 313/465 |
| 3,504,212 | 3/1970 | Wollentin et al. .................. 313/474 |
| 3,548,236 | 12/1970 | Kiss ..................................... 313/465 |
| 3,560,782 | 2/1971 | Hamann ............................. 313/465 |
| 3,598,750 | 8/1971 | Phillips ........................... 313/465 X |
| 3,700,804 | 10/1972 | Heyman .......................... 350/160 R |
| 3,705,323 | 12/1972 | Shidlovsky ......................... 313/465 |
| 3,706,845 | 12/1972 | Heyman .......................... 350/160 R |
| 3,773,540 | 11/1973 | Shidlovsky ..................... 313/467 X |
| 3,796,909 | 3/1974 | Chang et al. .......................... 315/12 |

*Primary Examiner*—Robert Segal
*Attorney, Agent, or Firm*—Arthur A. Smith, Jr.; Robert Shaw; Martin M. Santa

[57] ABSTRACT

A cathode ray tube (CRT) having a faceplate-deposited cathodochromic material, said CRT having electron beam write and erase. The erase beam is an electron beam focused to a size of approximately 0.010 inches at the image screen of the CRT and the intensity of the beam is about $10^5$ watts/in².

12 Claims, 11 Drawing Figures

CATHODE RAY TUBE EMPLOYING FACEPLATE-DEPOSITED CATHODOCHROMIC MATERIAL AND ELECTRON BEAM ERASE

The invention herein disclosed was made during a contract with the U.S. Department of Defense, Advanced Research Project Agency.

The present invention relates to cathodochromic cathode ray tubes having both electron beam write and erase.

Attention is called to the following related applications being filed herewith and hereby incorporated herein by reference: "A Process for Preparing Cathodochromic Materials Having Enhanced Coloration Properties," and A Cathode Ray Tube Employing the Same Ser. No. 456,962, filed Apr. 1, 1974 (Todd et al); "Cathode Ray Tube whose Image Screen Is Both Cathodochromic and Fluorescent, and the Material for the Screen" Ser. No. 456,961, filed Apr. 1, 1974 (Todd et al); "Method of and Apparatus for Exciting Luminescence in a Cathode Ray Tube Having an Image Screen Composed of a Material that is Both Cathodochromic and Cathodeoluminescent," Ser. No. 456,112, filed Apr. 1, 1974 (Todd). Attention is called also to the doctoral thesis of Lee T. Todd, Jr., (a copy of the thesis accompanies the application Ser. No. 456,962), which thesis is hereby incorporated herein by reference; the work upon which the thesis is based being done by the inventor Todd, Jr. at M.I.T. The thesis contains an exhaustive list of references to prior work as well as detailed theoretical analysis, neither of which is repeated here. The following Letters patent are made of record: U.S. Pat. Nos. 3,705,323 (Shidlovsky); 3,598,750 (Phillips); 2,752,521 (Ivey); 2,761,846 (Medved); 3,706,845 (Heyman et al.); 3,148,281 (Fyler).

Cathodochromic materials are CRT image screen materials that change color when exposed to an electron beam, thus permitting the writing of indicia thereon by known CRT techniques. The material can be returned to its original uncolored state by heating to about 200°C in the case of sodalite. CRT image screens of these materials exhibit very high resolution, long lifetime of coloration and high contrast in bright ambient light. The most difficult problem in all systems employing such cathodochromic materials is that of removing or erasing the indicia from the image screen in a way that is technically acceptable and economically feasible.

In said thesis, the following three journal articles and conference papers are noted by way of background information: J. Phys. D: Appl. Phys. 5, p.896 (1972, Bolwijn, et al.); Electronics Letters 8 (11), p.278 (1972, Hankins et al.); and I.E.R.E. Proc. Conf. on Computers-Systems and Tech., publ. by I.E.R.E. Bedford Square, London, p.81 (Hughes, et al.). These works relate to write and erase techniques for CRTs in which the cathodochromic material is deposited directly on the faceplate. Of particular pertinence are the disclosures of Hankins et al. and Hughes et al. which relate to the work of the same group; in that system, the viewing area is completely colored and information is written on the screen by selective thermal erase using an electron beam of higher thermal energy than is used for writing. Some disadvantages which arise from the Hankins et al. and Hughes et al. tube include the condition that reading is done by viewing white indicia on a dark background, the spots that constitute the writing are difficult to recolor properly for satisfactory erasure and the time for recoloring is quite long.

Accordingly, it is a principal object of the present invention to provide a CRT having a cathodochromic image screen in a system which permits the use of dark-colored indicia on light-colored background and one which has a write and erase mechanism which is both technically acceptable and economically feasible.

Another object is to provide a CRT that can be fabricated at greatly reduced cost, is of rugged construction and is easy to produce by mass production techniques.

Still another object is to provide a process for making the cathodochromic screen material to improve said erase characteristics.

Still another object is to provide a screen fabrication technique in which a thermal buffer layer insulates the cathodochromic material from the glass faceplate, thus improving erasure of the cathodochromic screen.

These and still further objects are discussed hereinafter and are particular delineated in the appended claims.

By way of summary, the objects of the invention are attained in a cathodochromic cathode ray tube in which both write and erase capability exists. The tube has an envelope within which there is disposed a cathodochromic sodalite image screen, an anode, and an electron gun that acts to write upon the screen and to erase the screen. The cathodochromic sodalite image screen material is sensitized to give good color contrast upon the written screen and the material is subjected to low temperature anneal to reduce the erase threshold to the order of 1 joule/cm$^2$. In the exemplary form, the tube has a faceplate and the image screen and anode are deposited in a sandwich structure upon the inner surface of the faceplate.

The invention is hereinafter described with reference to the accompanying drawing in which:

FIG. 5 shows a portion of the faceplate with the anode on the inner surface but having an unsensitized buffer layer between the anode and the image screen;

FIG. 6 is similar to FIG. 5 except that the buffer layer is adhered to the inner surface of the faceplate and the anode is an aluminum layer on the side of the cathochromic screen away from the faceplate; and FIG. 7 is a view similar to FIG. 6 but without the buffer layer.

Figure 1:
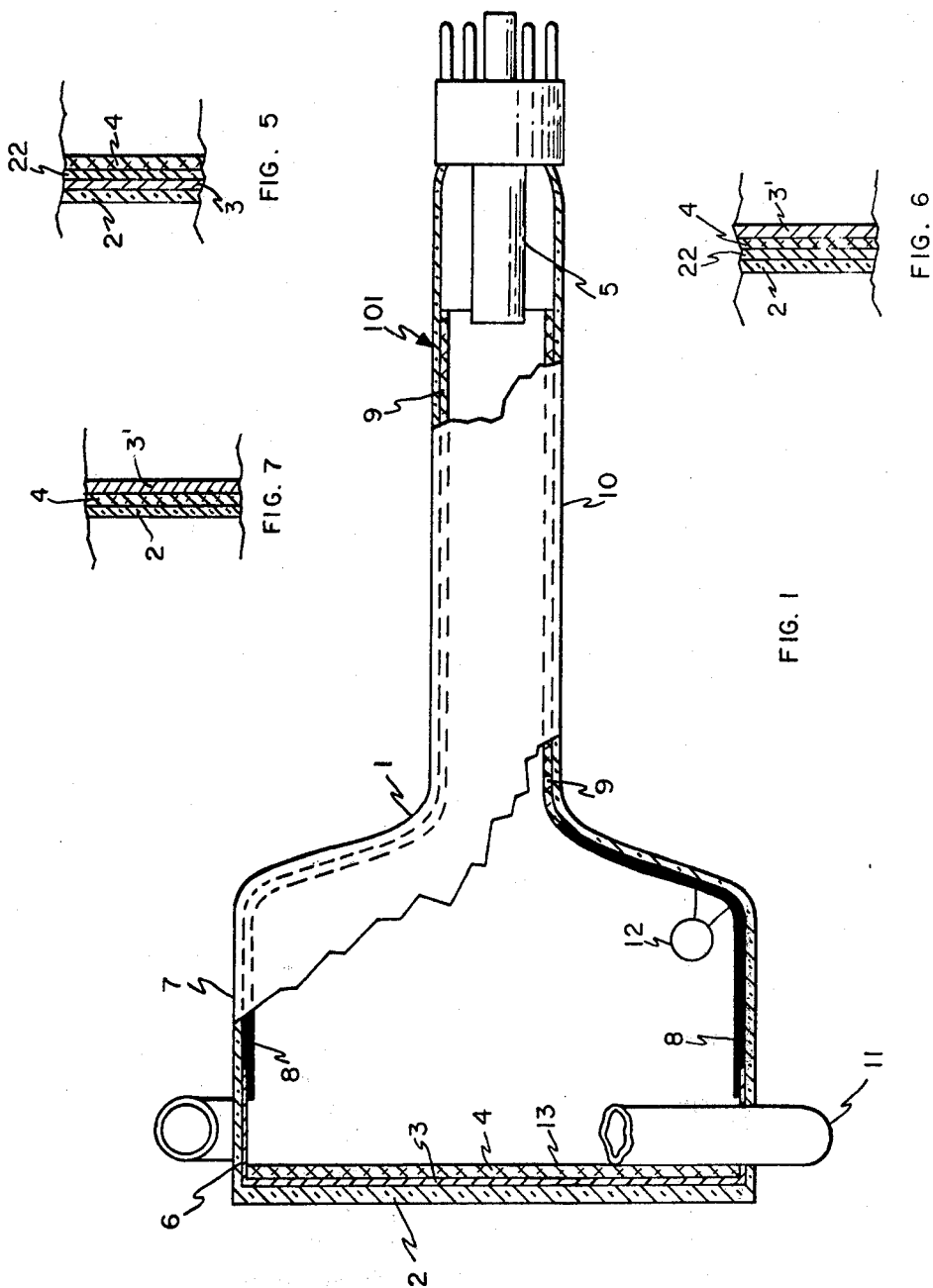
FIG. 1 is a side view, partially cutaway, showing a cathode ray tube embodying a number of the present inventive concepts and showing, among other things, a faceplate having an anode on the inner surface thereof and an image screen deposited upon the anode surface.

Turning now to FIG. 1, a cathodochromic cathode ray tube (CRT) 101, adapted to permit electron beam write and erase, comprises a glass envelope 1 having a transparent faceplate 2 on the inner surface of which there is deposited a sandwich structure consisting of a transparent anode 3 and a cathochromic image screen 4. An electron gun 5 acts to write upon the screen 4 as well as to erase the screen as hereinafter discussed. The anode consists of a thin layer of a transparent conductive coating such as $SnO_2$, deposited directly upon the inner surface of the faceplate 2 and extending along the inner sidewalls 7 of the envelope 1 a short way along the region designated 6 of the walls; an Aquadag (trademark of Acheson Colloids Company, a division of Acheson Industries, Inc., Port Huron, Mich.) or aluminum coating 8 overlaps the transparent coating 3 and extends further along the sidewalls 7; and an Aquadag or an aluminum coating 9 overlaps the coating 8 and extends along the tube neck 10 to the electron gun 5. Since the present CRT is preferably one in which the indicia on the image screen 4 is read by illumination from behind the screen by, for example, an external circular lamp 11 or a light source 12 within the envelope 1, a reflective aluminum coating at 8 offers the advantage over a black Aquadag coating 8 in that aluminum reflects additional viewing light through the screen, thus permitting enhanced image contrast. The transmission mode of illumination of the faceplate deposited cathodochromic screen 4 gives a contrast ratio that is approximately three times greater than a screen viewed by reflection.

The cathodochromic screen material comprises sensitized sodalite, $Na_6Al_6Si_6O_{24} \cdot 2(1-z)NaX$, wherein X is Br or a mixture of Br and OH and $z$ is the number of NaX vacancies created during the sensitizing treatment. Sensitizing of the cathodochromic material is effected by annealing in hydrogen between about 550°C and 900°C for an appropriate length of time and preferably at 750°C for about 15 minutes. It has been found for present purposes that a low erase threshold of the order of 1 joule/cm² can be given the above material by a low temperature air anneal, following the hydrogen anneal, in the range of 200° to 600°C for about 3 hours to 5 minutes, respectively. It is hypothesized that such annealing results in a deficiency of sodium in the final product. The low temperature air anneal degrades the contrast characteristics slightly, but it provides a dramatic decrease in the erase threshold. Best results were obtained when air annealing took place at 400°C for an hour. The process for making the screen materials is discussed in detail in the thesis and a single example is given below. Good effects from low-temperature anneal is obtained when X is bromine or bromine and OH mixtures, as above noted, but benefits are obtained by such anneal when X is chosen from the group that consists of chlorine, iodine, OH and mixtures thereof, as well.

Figure 2:
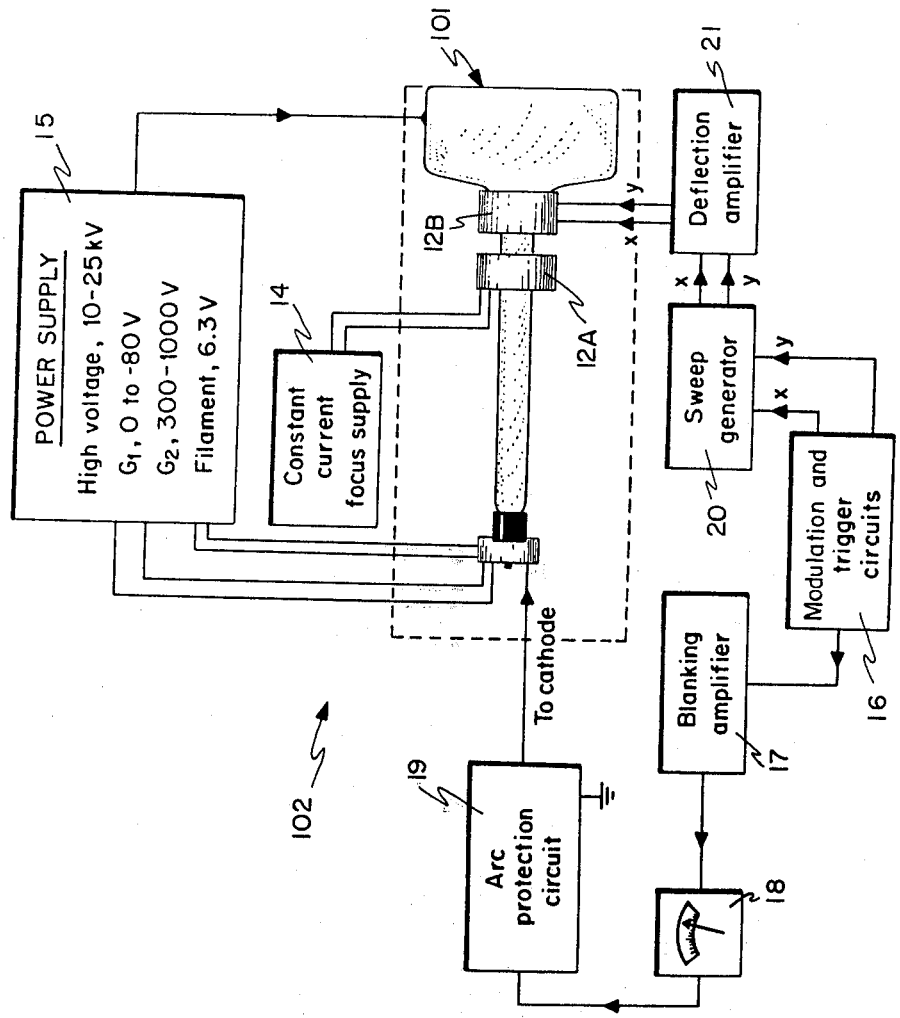
FIG. 2 is a block diagram of a cathodochromic cathode ray tube display system.

In the block diagram of a cathodochromic CRT display system in FIG. 2, the cathodochromic CRT 101 is shown with a magnetic focusing coil 12A and a magnetic deflection coil 12B. In this case, focusing of the electron beam is accomplished by passing a current, provided by a constant current supply 14, through the magnetic focusing coil 12A. Focusing can also be accomplished electrostatically as is known in the art. The electron beam is accelerated toward the screen by a high voltage, usually 20KV, provided by a power supply 15 which also provides the appropriate voltage for the electron gun, 5 in FIG. 1. Information is written on the image screen by a combination of modulation and deflection of the electron beam. Modulation circuits 16 send a signal to a blanking amplifier 17 which, in turn, varies the electron gun cathode voltage and thus the intensity of the electron beam from zero to full scale, usually 500 $\mu$ amps as read on an ammeter 18. These circuits are protected from internal CRT arcing by an arc protection circuit 19. The trigger circuits 16, in synchronism with the modulation circuits 16, trigger a sweep generator 20 which provides the appropriate voltage signals for positioning the electron beam. The voltage signals are then transformed to current waveforms by a deflection amplifier 21 and the currents, one for each axis, $x$ and $y$, pass through the deflection coil 12B, thus positioning the electron beam on the image screen, as is known in the art. The deflection may also be accomplished by electrostatic means. For raster scan operation, the electron beam moves horizontally across the screen and vertically down the screen such that the desired screen area is encompassed. As the beam sweeps, it is modulated on and off in such a manner to write the desired information. The sweep rate of the beam must be sufficiently slow to provide adequate exposure for dark coloration but fast enough that no significant heating of the screen material occurs. Once information is written on the screen, it will remain almost indefinitely or until it is intentionally erased. When erasure is wanted, the electron beam is again scanned, in a raster format, over the entire screen. In this case, the beam is maintained at constant intensity and turned-off only during retrace. The beam exposure is chosen such that the screen material is heated sufficiently for erasure. Generally, the erase beam exposure is achieved by reducing the sweep time of the beam by about a factor of three below the sweep time used for writing. However, both writing and erasing can be achieved using the same sweep time but differing beam current.

There are three problems which must be considered regarding the erasure of a faceplate deposited cathodochromic screen by the electron beam erase technique. First, erasure requires that the cathodochromic screen be heated to between 200° and 300°C while it is in contact with a large heat sink, the glass faceplate or other substrate. Therefore, to erase efficiently, it is necessary to raise the temperature of the cathodochromic screen rapidly before significant heat is lost to the rather thick glass faceplate. This is achieved by exposing the screen to a high electron beam exposure for a short period of time. Using an accelerating potential of 20 kV, a beam current of 500 $\mu$ amps and an electron beam spot size of approximately 11 mils, it is possible to erase a single spot on an air annealed bromine sodalite screen in about 60 $\mu$ secs. Measurements conducted at 500 $\mu$ amps indicate that for the above conditions, little or no heat is lost to the faceplate during the actual erasure. If the beam current is reduced below 300 $\mu$ amps and the exposure time increased to obtain erasure, one finds that the erasure energy density increases due to loss of heat to the faceplate. Since erasure requires a well-focused electron beam and a nearly constant beam energy density, it is necessary to include dynamic focus correction which insures uniform energy density over the screen area. These corrections are known in the art.

Figure 3A:
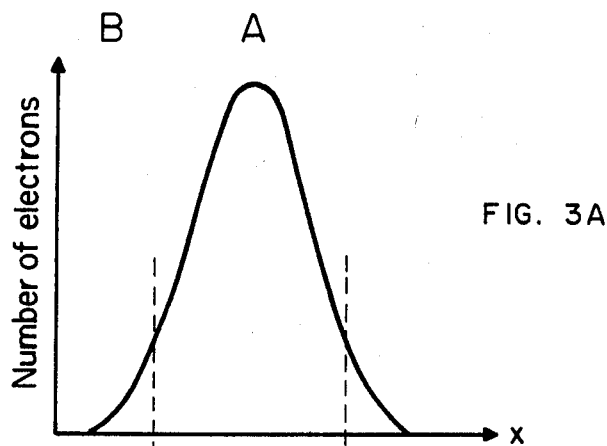
FIG. 3A shows the Gaussian distribution of electrons in an electron beam.
Figure 3B:
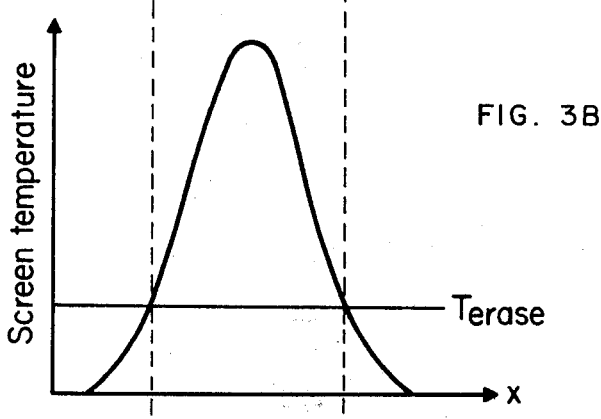
FIG. 3B shows the cathodochromic screen temperature distribution caused by electron beam heating.
Figures 3C, 3D:
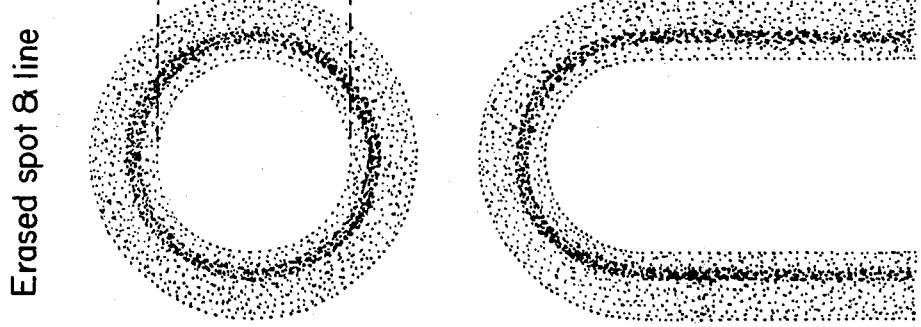
FIG. 3C shows an annular-shaped spot resulting from electron beam erase of a single spot on a cathodochromic image screen.
FIG. 3D shows a portion of a horizontal line resulting from electron beam erase of a line on a cathodochromic image screen.
Figure 4B:
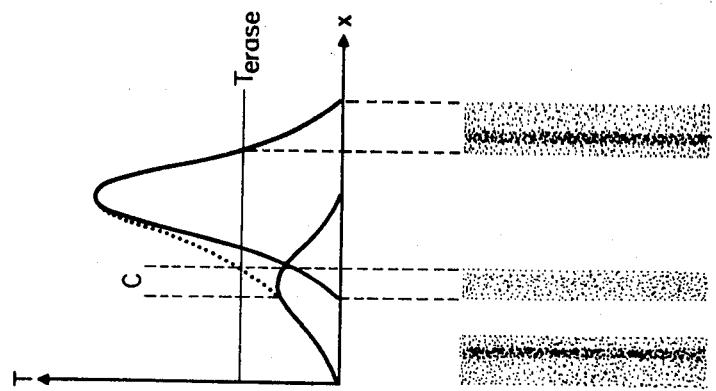
FIG. 4B is similar to FIG. 4A but for the case of rapid screen cooling.
Figure 4A:
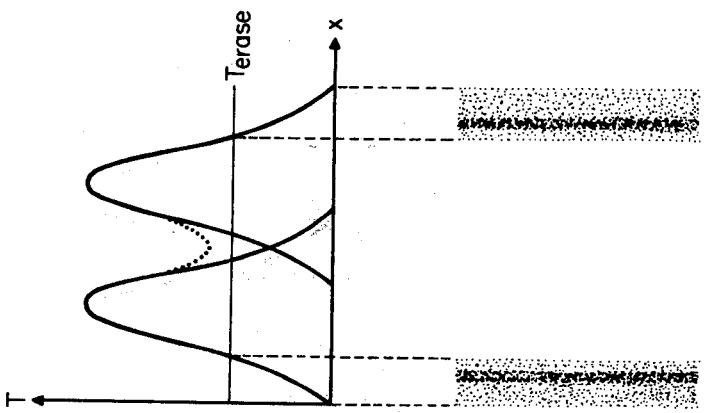
FIG. 4A shows a schematic representation of the overlapping electron beam erase technique for the case of no screen cooling.

The second problem results from the Gaussian distribution of electrons in the electron beam. The electron distribution shown in FIG. 3A causes a screen temperature distribution similar to that shown in FIG. 3B. Since all of the electrons in the beam are accelerated by a high voltage, they are all capable of writing. However, the electrons in area labeled A, FIG. 3A, strike a portion of the screen which is above the erase temperature $T_{erase}$, and only erasure occurs. The electrons in the outer tails, area labeled B, strike a cooler part of the screen and thus cause coloration. The result is a donut-shaped spot, FIG. 3C, and when the beam sweeps across the screen, the line in FIG. 3D results. Therefore, electron beam heating does not cause complete erasure but rather simultaneous writing and erasing. Complete screen erasure can, however, be accomplished, as pointed out by Hughes, et al., by erasing an area before the adjacent erased area cools; see FIG. 4A. Assuming no screen cooling, FIG. 4A, complete screen erasure can be achieved by overlapping adjacent horizontal lines such that the overall screen temperature is above the erase value. However, the assumption of no screen cooling is not valid since the initially erased line will have cooled slightly by the time the electron beam returns for the overlapping. FIG. 4B shows a situation in which complete erasure cannot be achieved because of rapid screen cooling. The total thermal distribution in the area labeled C is not above the erase temperature and the electrons impinging on that area cause writing. By properly designing the screen to provide a sufficiently long thermal decay time or by increasing the power density such that the time between horizontal sweeps can be reduced, it is possible to achieve complete screen erasure using this overlapping technique. However, it is important to point out that in many situations it is not necessary to remove completely the line structure. From a normal viewing distance, the internal line structure is not discernible and the observed effect is merely a slightly darker background.

The third problem again concerns the fact that the cathodochromic screen is deposited directly on the glass faceplate and that the material must be heated to a rather high temperature to effect erasure. As particles are deposited on the faceplate to form the image screen, the initial particles adhere directly to the faceplate while subsequent particles are supported from the faceplate by the initial layer of particles. During erasure, the electron beam heats the particles furthest from the screen the most and those closest to the screen the least, since it is impinging from the back side of the screen. This fact, along with the fact that the particles closest to the faceplate are in extremely good contact with a large heat sink, the glass faceplate, make it very difficult to erase the coloration of the particle surfaces directly adhered to the faceplate. If the beam exposure is increased sufficiently to erase these particles, the particles not adhered to the faceplate are often overheated and permanent damage results, causing the particles to lose their coloration capability. When the particles adhered to the faceplate cannot be erased, these particles become permanently colored and cause a purplish haze to appear over the entire image. In one embodiment of the present invention, this problem is avoided by placing a thin porous layer of insulating particles, as shown at 22 in FIGS. 5 and 6, between the faceplate 2 of the CRT and the image screen 4. These particles have the property that they cannot be colored by the electron beam and may be particles of unsensitized sodalite. Since the buffer layer 22 is very porous, it reduces the thermal contact between the image screen and the glass faceplate and greatly improves the quality of erase. In a typical CRT, the active layer density is 4 mg/cm$^2$ and the buffer layer 0.4 mg/cm$^2$.

Although the transmission-type CRT, as shown in FIG. 1, is the best embodiment of the inventive concepts herein disclosed, it is also possible to use the same concepts in reflective displays. In this case, the anode is a thin layer of aluminum, 3' in FIGS. 6 and 7, which covers the major surface of the image screen 4 on the electron gun side of the CRT. information on the image screen is read in reflection using light incident upon the front of the faceplate. The major disadvantage of this configuration is the evaporation of the aluminum layer during erasure due to the high intensity electron beam (e.g., 10$^5$ watts/in$^2$) used in these devices, but such anodes can be used. FIG. 6 shows the case of a reflective display in which the screen sandwich structure includes a buffer insulation layer 22, while FIG. 7 shows the same type of device minus the buffer layer.

To summarize the above, the combination of the low erase threshold resulting from air annealing of sodalite, an overlapping erase technique using a high energy density electron beam and the use of a thermal buffer layer, results in a cathodochromic CRT that is economical to build, structurally sound, and provides dark indicia on a white background. It should be noted that cathodochromic sodalite screen material subjected to the present low temperature air annealing process can be employed in more conventional CRTs and can be erased by more conventional techniques.

The process for making the screen materials and the tests run thereon are discussed in detail in the thesis; a single example follows:

The sodalite powders are prepared by either hydrothermal growth or sintering. This example will outline the procedure for preparing the material hydrothermally and the measurement of the erasure energy density. Chemicals are combined according to the equation

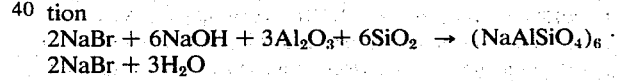
2NaBr + 6NaOH + 3Al$_2$O$_3$ + 6SiO$_2$ → (NaAlSiO$_4$)$_6$ · 2NaBr + 3H$_2$O with the charge consisting of: NaBr, 4.12g; Al$_2$O$_3$ 6.12g; SiO$_2$, 7.20g. The chemicals are thoroughly mixed and placed in a silver-lined hydrothermal pressure vessel with an internal capacity of approximately 130 ml. Ninety millimeters of solution of H$_2$O and 40.0 grams NaOH are then added to the charge within the vessel and the vessel sealed. The lower portion of the vessel is maintained at about 360°C and the upper portion at 340°C for about 24 hours and the vessel is then allowed to cool to room temperature. The product is a slurry of crystalline powder in a concentrated NaOH solution. The NaOH is removed by washing the powder repeatedly with distilled water. Finally, the powder is dried for 1 hour in an oven at about 130°C and then crushed to a fine particle size.

The material, as grown, is not cathodochromic but must first be sensitized by annealing in a reducing atmosphere. Typically, the powder of sodalite is annealed in hydrogen between 550° and 750°C and preferably at 750°C for about 15 minutes. The sensitized powder is then annealed in air at between 200° and 600°C for about 5 hours and 5 minutes, respectively, to reduce the erase threshold as disclosed herein. Best results were obtained when low temperature anneal was effected in air at 400°C for 1 hour. The resulting powder, average particle size of 13 μm, is then used as the image screen on a 5 inch diameter CRT. The screen is settled by a conventional water settling technique with the buffer layer being deposited first. A cushion layer of barium acetate and distilled water is dispensed over the faceplate of an inverted CRT bottle. Approximately 0.05 grams of unsensitized sodalite powder is thoroughly mixed with a solution of potassium silicate and distilled water and dispensed over the surface of the cushion layer using a showerhead. The particles are allowed to settle for 45 minutes and the supernatant liquid is poured off. The screen is then dried by a gentle flow of nitrogen gas. The process is next repeated using one-half gram of sensitized sodalite powder, as described above, to form the actual image screen.

Prior to the settling process, the faceplate of the CRT envelope and approximately 2 inches along the adjacent sidewalls are coated with an antimony-doped coating of tin oxide using state of the art techniques. The anode circuit is completed by painting the inside of the bulb, from the edge of the $SnO_2$ coating to the electron gun area, with an Aquadag paint. Next, the electron gun is sealed in the CRT envelope and the assembly baked and out-gassed to a pressure of approximately $5 \times 10^{-7}$ mm of Hg before tip-off. The final steps of fabrication involve the rf flashing of the getter and the activation of the cathode.

Measurement of the erasure energy density was accomplished using the above CRT in a system similar to that shown in FIG. 2. The electron beam accelerating voltage was 20 kV and the beam current approximately 500 μ amps concentrated in a spot size of about 10 mils. The procedure for determining the erase energy density is begun by exposing single horizontal lines (~1 inch in length) with increased exposure, by increasing the exposure time, until a uniform centerline erase occurs. Then knowing the horizontal scan time, the vertical time is determined for a 50 line raster. Successive rasters are then exposed, each on a previously uncolored area, in which the vertical height is decreased after each exposure until the lines begin to overlap. In some cases, depending on the screen design and material, complete erasure can be achieved by properly overlapping the individual lines as discussed with regard to FIGS. 4A and 4B. When complete erasure is not possible, minimum intermediate line structure and shortest erase times are achieved by simply overlapping the writing edges of each line. Once the conditions are achieved for optimum erasure, the erasure energy density is calculated using the equation:

$$E_e = VIt/A$$

where $E_e$ is the erasure energy density, $V$ is the accelerating potential, $I$ the beam current, $t$ the exposure time, and $A$ the erased area. The erasure energy density for the image screen of the CRT described above was approximately 1 joule/cm².

Further modifications of the invention herein disclosed will occur to persons skilled in the art, and all such modifications are deemed to be within the spirit and scope of the invention as defined by the appended claims.

What is claimed is:

1. For use in a cathode ray tube, an image screen that comprises a thermal buffer layer of unsensitized particles upon a substrate and a layer of sensitized cathodochromic sodalite supported by the buffer layer and thermally insulated from the substrate by the buffer layer.

2. A cathode ray tube system adapted to permit electron beam write and erase, that comprises: a cathode ray tube envelope, an image screen that comprises sensitized cathodochromic sodalite material disposed upon a substrate within the envelope; an anode; and electron gun means which produces an electron beam of one exposure to write on the image screen and another, and higher, exposure to directly heat the image screen material and cause erasure; said sensitized cathodochromic sodalite having an erase threshold of the order of 1 joule/cm² or less and sufficiently low that during electron beam erase little or no heat is transferred to the substrate.

3. A cathode ray tube system as claimed in claim 2 further comprising a thermal buffer layer of unsensitized particles interposed between the said substrate and said sensitized cathodochromic sodalite material.

4. A cathode ray tube system as claimed in claim 3 in which the unsensitized particles are unsensitized sodalite.

5. A cathode ray tube system as claimed in claim 4 in which the unsensitized particles have a density of about 0.5 milligrams per square centimeter.

6. A cathode ray tube system as claimed in claim 3 in which the substrate is conductive and forms a portion of the anode circuit of the cathode ray tube.

7. A cathode ray tube system as claimed in claim 3 in which the substrate is non-conductive and in which a layer of conductive material is disposed upon the substrate to form a portion of the anode circuit of the cathode ray tube.

8. A cathode ray tube system as claimed in claim 2 in which the substrate is the faceplate of the cathode ray tube envelope.

9. A cathode ray tube system as claimed in claim 2 in which the electron gun means provides an electron beam focused to a size of about 10 mils at the image screen and the intensity of the beam is about $10^5$ watt-s/in².

10. A cathode ray tube system as claimed in claim 9 in which the electron gun means provides an electron beam whose sweep, when acting to erase the screen, is much slower than the sweep used to write on the screen.

11. A cathode ray tube system as claimed in claim 2 in which the electron gun means provides a beam which raster scans to erase the screen, the center-to-center separation between successive lines in the raster in combination with the beam width and exposure being such that the overall screen temperature between successive lines is above the erase value.

12. A cathode ray tube system as claimed in claim 2 in which the sodalite material comprises $Na_6Al_6Si_6O_{24} \cdot 2(1-z)NaX$, wherein X is chosen from the group consisting essentially of bromine and mixtures of bromine and OH, z is the number of NaX vacancies, and $0 < z - 1$.

* * * * *